United States Patent [19]

Nakaki et al.

[11] Patent Number: 5,208,797
[45] Date of Patent: May 4, 1993

[54] MAGNETO-OPTICAL RECORDING MEDIA AND APPARATUS

[75] Inventors: Yoshiyuki Nakaki; Takashi Tokunaga; Tatsuya Fukami; Motohisa Taguchi; Kazuhiko Tsutsumi, all of Amagasaki, Japan

[73] Assignee: Mitsubishi Denki Kabushiki Kaisha, Japan

[21] Appl. No.: 612,798

[22] Filed: Nov. 14, 1990

[30] Foreign Application Priority Data

Nov. 14, 1989 [JP] Japan .................... 1-296856

[51] Int. Cl.$^5$ .............................. G11B 7/00
[52] U.S. Cl. ...................... 369/100; 369/13; 360/59
[58] Field of Search ........... 369/13, 100, 110, 111, 369/283, 286, 288, 280, 275.2, 14, 15; 360/59, 114

[56] References Cited

U.S. PATENT DOCUMENTS

| 4,878,132 | 10/1989 | Aratani et al. | 360/59 |
| 4,917,751 | 4/1990 | Ohta et al. | 156/272.2 |
| 5,025,430 | 6/1991 | Takokoro et al. | 369/13 |
| 5,077,120 | 12/1991 | Kato et al. | 428/200 |

FOREIGN PATENT DOCUMENTS 0258978 3/1988 European Pat. Off. .
0382859 8/1990 European Pat. Off. .

OTHER PUBLICATIONS

Recording Power Characteristics of 130 mm Overwritable MO Disk by Laser Power Modulation Method, Matsumoto et al., Oct. 16, 1989.
Magneto-Optic Recording Medium and Apparatus, Aug. 23, 1989.

Primary Examiner—Tommy P. Chin
Assistant Examiner—Robert Chevalier
Attorney, Agent, or Firm—Wolf, Greenfield & Sacks

[57] ABSTRACT

In a magneto-optical recording system for recording information with bits having upward magnetization and having downward magnetization on a recording layer of a magneto-optical recording medium, having four magnetic layers exchange-coupled with each other. A laser beam directed onto the medium is modulated to heat the magneto-optical recording medium to two values, for "High" writing and for "Low" writing. During "High" writing, the first to third layers lose magnetization because their Curie temperatures are exceeded, and the direction of the magnetization of the first layer, which is the recording layer is determined mainly by the magnetostatic coupling from the the fourth layer. During "Low" writing, the first and the third layers lose their magnetization as their Curie temperatures are exceeded, and the direction of the magnetization of the first layer is determined by the exchange coupling from the second layer, which in turn is dependent on the exchange coupling from the fourth layer.

26 Claims, 12 Drawing Sheets

1ST MAGNETIC LAYER
2ND MAGNETIC LAYER
3RD MAGNETIC LAYER
4TH MAGNETIC LAYER

MAGNETO-OPTICAL RECORDING MEDIA AND APPARATUS

FIELD OF THE INVENTION

This invention relates to magneto-optical recording media that are overwritable by optical modulation, and apparatus utilizing such media.

BACKGROUND OF THE INVENTION

Figure 10A:
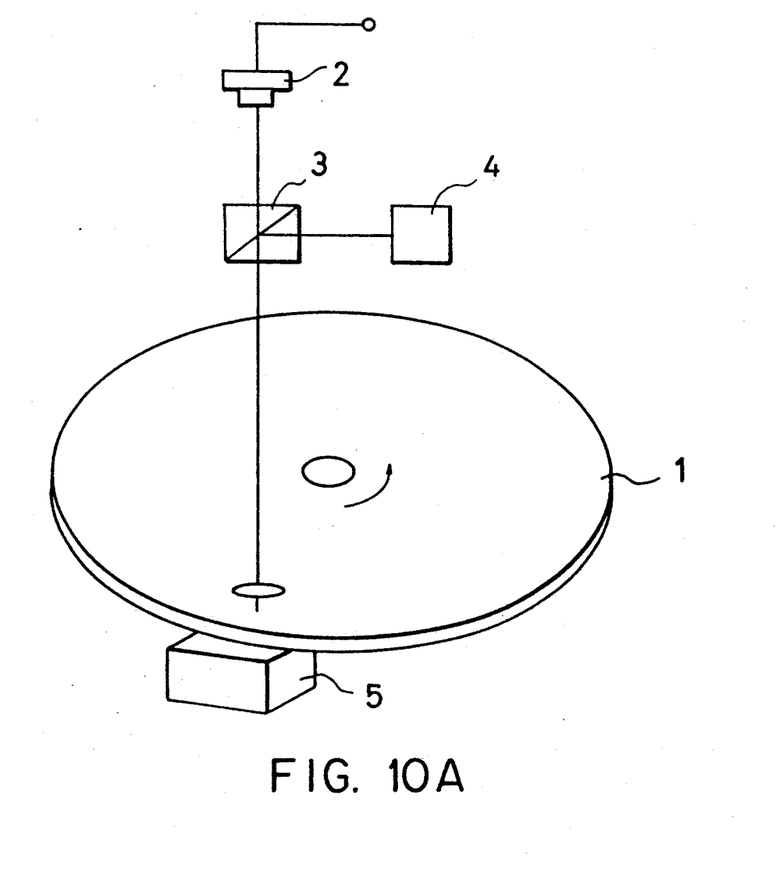
Figure 10B:
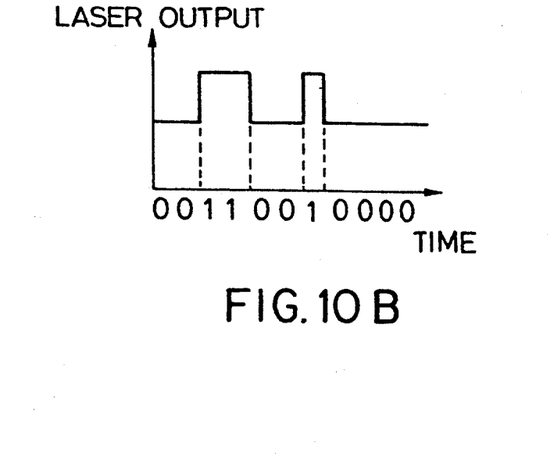

FIG. 10 shows a structure of a magneto-optical recording apparatus in an invention of our earlier application.

In the drawing, 1 is a magneto-optical recording medium, 2 is a semiconductor laser, 3 is a beam splitter, 4 is a reproducing apparatus, and 5 is an external magnetic field generating device. The structure of the magneto-optical recording medium in the invention of our earlier application is also shown in FIG. 11.

Figure 11:
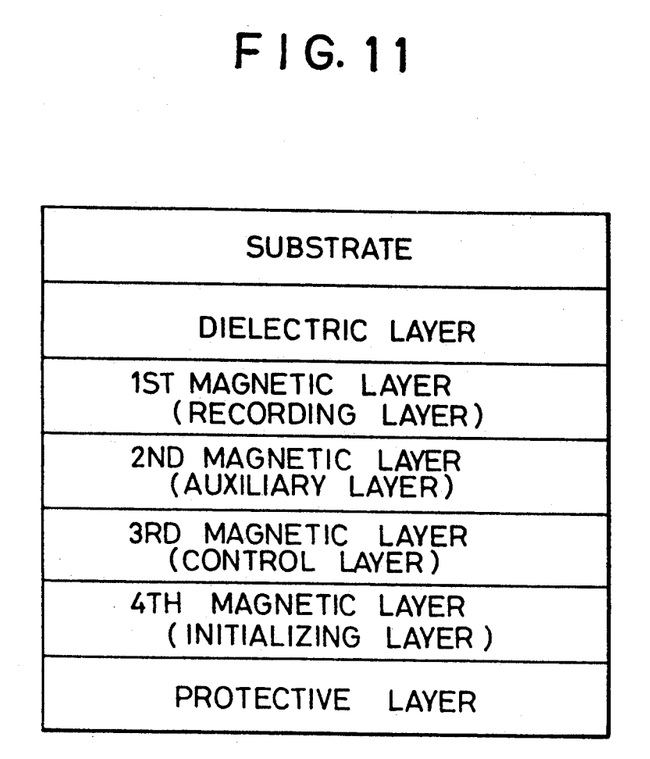
FIG. 11 is a structural drawing illustrating a prior-art magneto-optical disk medium.

In the magneto-optical recording medium, as shown in FIG. 11, the following, for example, are formed on a substrate by a method such as sputtering:

| | | |
|---|---|---|
| Dielectric layer: | $SiN_x$ | 650 angstroms |
| First magnetic layer: | $Tb_{22}Fe_{69}Co_9$ | 800 angstroms |
| Second magnetic layer: | $Gd_8Dy_{17}Fe_{60}Co_{15}$ | 1500 angstroms |
| Third magnetic layer: | $Tb_{16}Fe_{84}$ | 200 angstroms |
| Fourth magnetic layer: | $Tb_{30}Co_{70}$ | 400 angstroms |
| Protective layer: | $SiN_x$ | 700 angstroms |

Adjacent magnetic layers are here coupled by exchange forces. The first magnetic layer is the recording layer for recording and storing information. The second magnetic layer, third magnetic layer, and fourth magnetic layer do not function as information media but are additional layers that enable direct overwriting by optical modulation. The fourth magnetic layer is an initializing layer, the sublattice magnetization of which does not reverse under heating due to laser illumination within the operating range and acts in opposition to the bias magnetic field. The third magnetic layer is a control layer for shielding the exchange force from the fourth magnetic layer at high temperatures.

Next the operation will be explained.

[0] Initialization process

Figure 12:
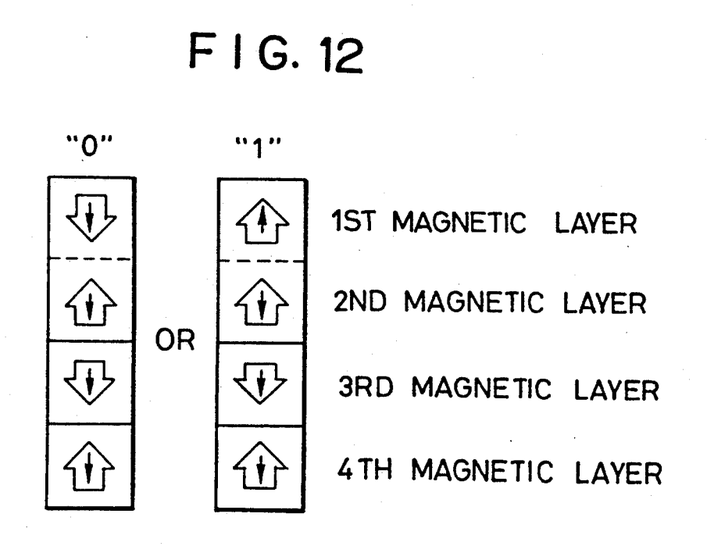
FIG. 12 is an explanatory drawing for explaining initialization.

After formation of the layers of the magneto-optical recording medium, out of the $2^4$ sublattice magnetic moment configurations, the recording medium is put first and once only into the two magnetization states shown in FIG. 12 in which the magnetic moments of the transition-metal (TM) sublattices of the second magnetic layer, the third magnetic layer, and the fourth magnetic layer point down. After recording, these two states will be the recorded states. Outlined arrows in the drawings will hereinafter indicate magnetization, arrows appearing therewithin or alone will indicate the magnetic moment of the transition-metal sublattice, dotted line will indicate the state in which a magnetic wall exists between magnetic layers, and a horizontal line will indicate the state of heating above the Curie temperature, in which ferromagnetization is lost.

The bias magnetic field Hb is generated so that in the vicinity of the Curie temperature, the sublattice magnetization direction of the second magnetic layer opposes the magnetization orientation of the fourth magnetic layer. If the fourth magnetic layer is oriented in the down direction, accordingly, then the orientation will be upward if it comprises a magnetic material having a compensation temperature below the Curie temperature, and downward if it comprises a magnetic material not having a compensation temperature below the Curie temperature. In this embodiment it is generated in the upward direction.

If not explicitly stated otherwise, the word magnetization will hereinafter denote the magnetization of the transition-metal sublattice.

[1] Low-temperature operation

Figure 13:
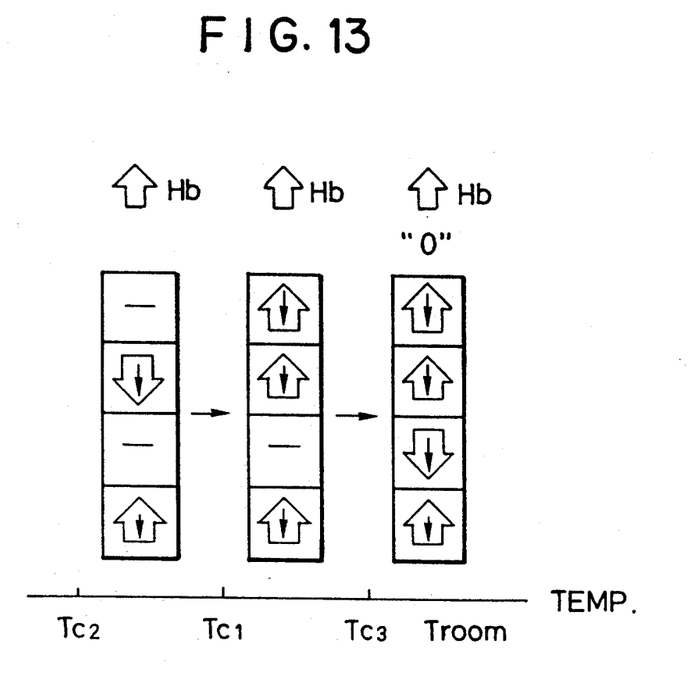
FIG. 13 is an explanatory drawing illustrating the low-temperature recording operation.

When the laser output is raised higher than in reproduction and the magnetic layers in the focused spot are heated to the vicinity of the Curie temperature of the first magnetic layer, as shown in FIG. 13, the magnetization direction of the second magnetic layer remains unchanged, and the magnetization of the second magnetic layer is transferred to the first magnetic layer, so the first magnetic layer becomes magnetized in the down direction.

The third magnetic layer and the fourth magnetic layer play no particular role in this process, and even if the magnetization of the third magnetic layer is lost, it is magnetized in the same direction again by the exchange coupling with the fourth magnetic layer, giving the initial "0" state.

[2] High-temperature operation

Figure 14:
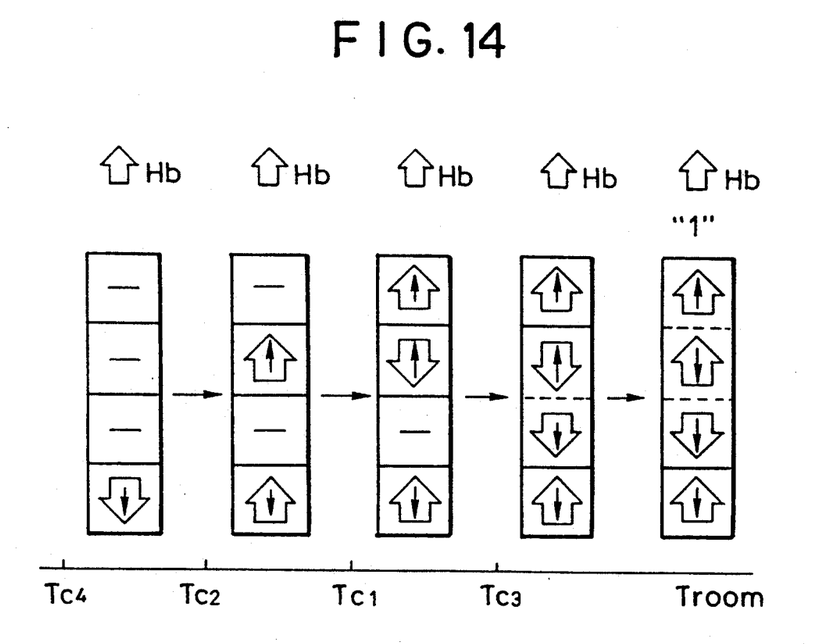
FIG. 14 is an explanatory drawing illustrating the high-temperature recording operation.

When the temperature is raised to the vicinity of the Curie temperature of the second magnetic layer as shown in FIG. 14, the first magnetic layer and third magnetic layer are demagnetized, but the magnetization direction of the fourth magnetic layer does not change. The second magnetic layer receives no exchange forces from the first magnetic layer and the third magnetic layer, but is magnetized by the external magnetic field in the up direction.

When the temperature falls below the Curie temperature of the first magnetic layer, the magnetization of the second magnetic layer is transferred to the first magnetic layer and the first magnetic layer becomes magnetized in the up direction.

When the temperature falls below the Curie temperature of the third magnetic layer, the magnetization of the third magnetic layer aligns with the fourth magnetic layer in the down direction, then the temperature falls further, and the magnetization of the second magnetic layer aligns with the magnetization of the fourth magnetic layer via the third magnetic layer, in the down direction, giving the initial "1" state.

In this way, optically modulated direct overwriting is possible by modulating only the laser light intensity.

Although prior-art magneto-optical recording media structured as above enable direct overwriting, the external magnetic field generating device is an obstacle to the further reduction of the size of the magneto-optical recording apparatus.

Another problem is that the external magnetic field generating device is disposed on the opposite side of the magneto-optical recording medium from the optical head. If double-sided media are used, it is not possible to place the optical head on the opposite side of the magneto-optical recording medium.

SUMMARY OF THE INVENTION

A magneto-optical recording medium according to the invention is for use in a system for recording information with bits having upward magnetization and having downward magnetization on a recording layer of the magneto-optical recording medium, and comprises:

a first magnetic layer with perpendicular magnetic anisotropy, a second magnetic layer disposed on this first magnetic layer and coupled to said first magnetic layer by an exchange force, a third magnetic layer disposed on this second magnetic layer and coupled to said second magnetic layer by an exchange force, and a fourth magnetic layer disposed on this third magnetic layer and coupled to said third magnetic layer by an exchange force;

said magneto-optical recording medium satisfying:

$Tc4 > Tc1$,
$Tc4 > Tc3$,
$Tc2 > Tc1$, and
$Tc2 > Tc3$, the magnetization of the first magnetic layer being not reversed by magnetic reversal of the second magnetic layer at room temperature, wherein the sublattice magnetization directions of the second magnetic layer, the third magnetic layer, and the fourth magnetic layer are initialized so as to be aligned in the up direction or the down direction at room temperature after recording, and when the medium is heated to a first predetermined temperature, a stray magnetic field generated by said magneto-optical recording medium acts so that the sublattice magnetization direction of the second magnetic layer is recorded in the direction opposite to said initialization direction.

The second magnetic layer preferably comprises a layer of magnetic material having a compensation temperature below its Curie temperature, and the fourth magnetic layer preferably comprises a layer of a magnetic material of which the magnetization existing in the same direction as the transition-metal sublattice magnetization is reduced as the temperature rises.

The second magnetic layer perferably comprises a layer of magnetic material the rare-earth (RE) sublattice magnetization of which is dominant at room temperature and which does not have a compensation temperature, and the fourth magnetic layer is preferably formed of a magnetic material of which the magnetization existing in the same direction as the rare-earth sublattice magnetization is reduced as the temperature rises.

It is advantageous if the magneto-optical recording medium is adhesively joined to a read-only optical recording medium, or a write-once optical recording medium, thereby to form a composite recording medium.

A magneto-optical recording system according to the invention is for recording information with bits having upward magnetization and having downward magnetization on a recording layer of a magneto-optical recording medium, and comprises:

a magneto-optical recording medium as recited above;

a means for directing a laser beam onto the medium; and a means for modulating said beam to heat said magneto-optical recording medium to at least two values according to binary information to be recorded;

wherein the sublattice magnetization directions of the second magnetic layer, the third magnetic layer, and the fourth magnetic layer are initialized so as to be aligned in the up direction or the down direction at room temperature after recording, and under illumination by a laser beam that heats said magneto-optical medium to the higher temperature of said two laser beam values, a stray magnetic field generated by said magneto-optical recording medium acts so that the sublattice magnetization direction of the second magnetic layer is recorded in the direction opposite to said initialization direction.

In a magneto-optical recording system for recording information with bits having upward magnetization and having downward magnetization on a recording layer of a magneto-optical recording medium, having four magnetic layers exchange-coupled with each other. A laser beam directed onto the medium is modulated to heat the magneto-optical recording medium to two values, for "High" writing and for "Low" writing. During "High" writing, the first to third layers lose magnetization because their Curie temperatures are exceeded, and upon cooling, the second layer is magnetized by a stray magnetic mainly consisting of the magnitic field from the fourth layer. The magnetization of the second layer is transferred to the first layer when the first layers cools below its Curie temperature, by exchange coupling. After this transfer to the first layer, the magnetization of the second layer is reversed due to exchange coupling from the fourth layer through the third layer, to which the magnetization of the first magnetization is transferred, when the third layer cools below its Curie temperature. The direction of magnetization of the second layer as determined by the exchange coupling is opposite to the direction of the magnetization as determined by the stray magnetic field. Even when the magnetization of the second layer is reversed, the first layer is not reversed due to its high coercivity. Thus, the first layer attains magnetization in a first direction. During "Low" writing, the first and the third layers lose their magnetization as their Curie temperatures are exceeded, but the second layer does not lose its magnitization, and its magnetization is retained, and transferred to the first layer when the first layer cools, so the first layer attains a magnetization in the second direction, opposite to the first direction.

Thus, direct overwriting is possible by binary modulation of the emission intensity of the recording laser beam, without external provision of a magnetic field generating device.

DETAILED DESCRIPTION OF THE PREFERRED EMBODIMENTS

Embodiments of this invention will now be described with reference to the drawings.

Embodiment 1

Figure 1:
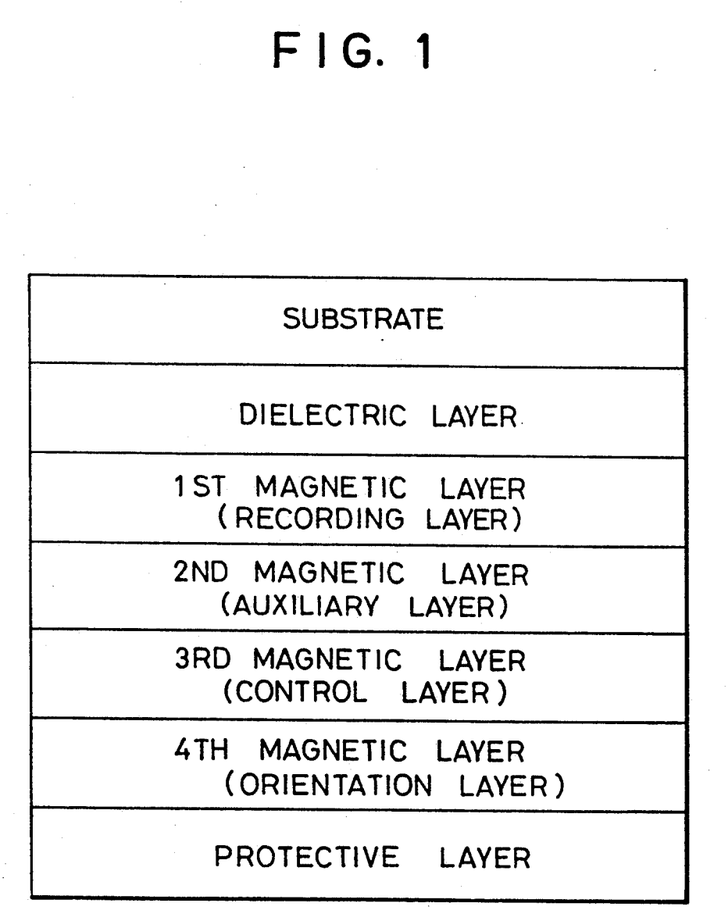
FIG. 1 is a structural drawing illustrating an embodiment of the invented magneto-optical disk medium.

FIG. 1 shows a sectional view of a magneto-optical recording medium of a first embodiment of this invention, which is identical to the prior-art example except for the fourth magnetic layer, and which has similar functions caused by exchange forces for low-temperature operation.

The recording medium comprises, for example, the following, formed on a glass substrate by a process such as sputtering.

| | | |
|---|---|---|
| Dielectric layer: | $SiN_x$ | 650 angstroms |
| First magnetic layer: | $Tb_{22}Fe_{69}Co_9$ | 800 angstroms |
| Second magnetic layer: | $Gd_8Dy_{17}Fe_{60}Co_{15}$ | 1500 angstroms |
| Third magnetic layer: | $Tb_{16}Fe_{84}$ | 200 angstroms |
| Fourth magnetic layer: | $Tb_{20}Co_{80}$ | 800 angstroms |
| Protective layer: | $SiN_x$ | 700 angstroms |

Adjacent magnetic layers are here coupled by exchange forces. In the embodiment under consideration, the first, third and fourth magnetic layers are TM rich, while the second magnetic layer is RE rich below its compensation temperature which is close to the Tc1, but is TM rich above the compensation temperature. The fourth magnetic layer is an orientation layer having an exchange force that opposes the magnetostatic coupling force from the initializing layer.

Next the operation will be described.

[0] Initialization process

The initialization process after formation of the layers of the magneto-optical recording medium is the same as in the prior-art example. No external magnetic field is needed, because its function is added to the orientation layer.

[1] Low-temperature operation

Figure 2A:
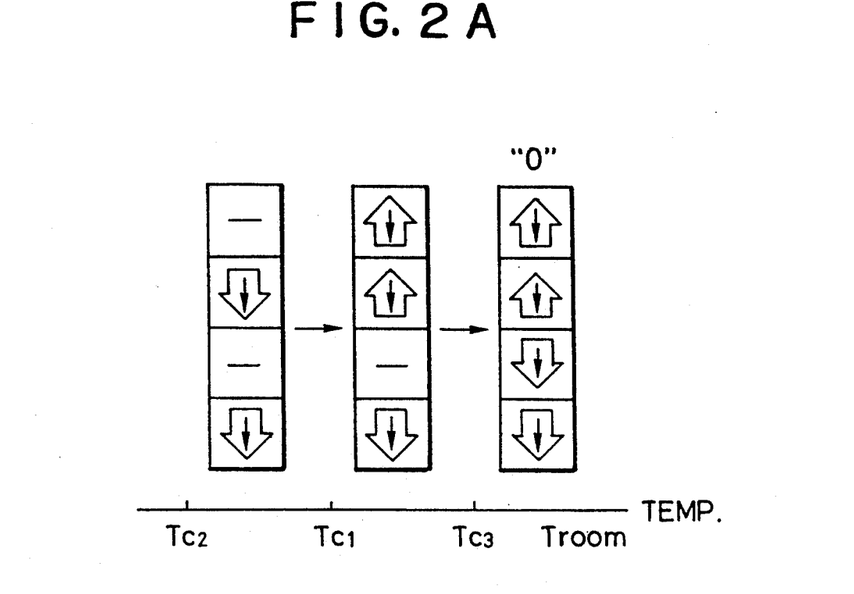
FIG. 2A is an explanatory drawing illustrating the low-temperature recording operation.

Low-temperature operation is as shown in FIG. 2A and is basically the same as in the prior-art example.

[2] High-temperature operation

Figure 2B:
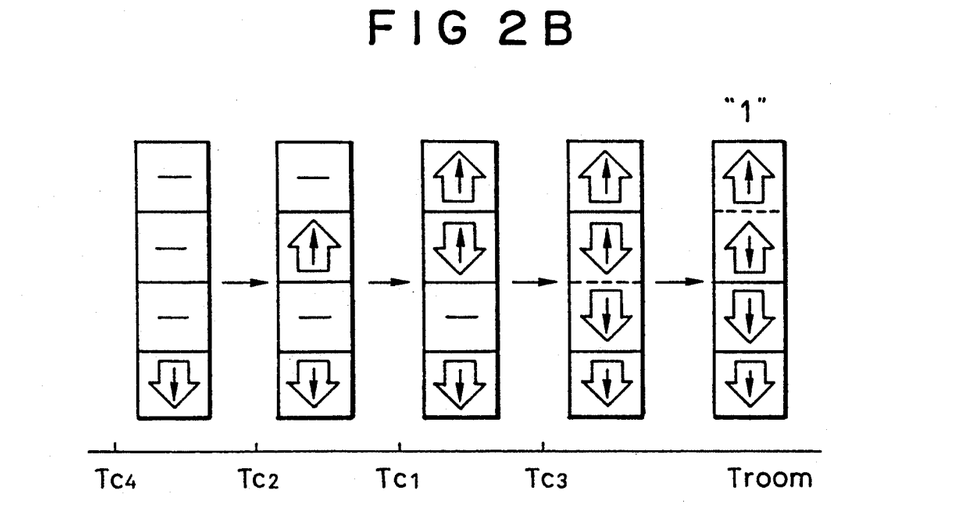
FIG. 2B is an explanatory drawing illustrating the high-temperature recording operation.

When the temperature is raised to the vicinity of the Curie temperature of the second magnetic layer as shown in FIG. 2B, the first magnetic layer and the third magnetic layer are demagnetized, but the magnetization direction of the fourth magnetic layer does not change. The second magnetic layer receives no exchange forces from the first magnetic layer and the third magnetic layer, but is magnetized in the up direction by stray magnetic field, mainly consisting of magnetostatic coupling with the fourth magnetic layer. Other contribution of the stray magnetic field which acts on the second magnetic layer is a leakage magnetic flux from the neighboring regions of the same second magnetic layer. It is also possible to utilize the magnetic field leaking out of the optical head, particularly, the coils for driving an objective lens for focusing and tracking. It is advantageous if magnetic field leaking out of the optical head is in the same direction as the magnetostatic coupling force from the fourth magnetic layer.

When the temperature falls below the Curie temperature of the first magnetic layer, the magnetization of the second magnetic layer is transferred to the first magnetic layer and the first magnetic layer becomes magnetized in the up direction.

When the temperature falls below the Curie temperature of the third magnetic layer, the magnetization of the third magnetic layer aligns with the fourth magnetic layer in the down direction, and when the temperature falls further, the magnetization of the second magnetic layer aligns with the magnetization of the fourth magnetic layer via the third magnetic layer, in the down direction, giving the initial "1" state.

Figure 3:
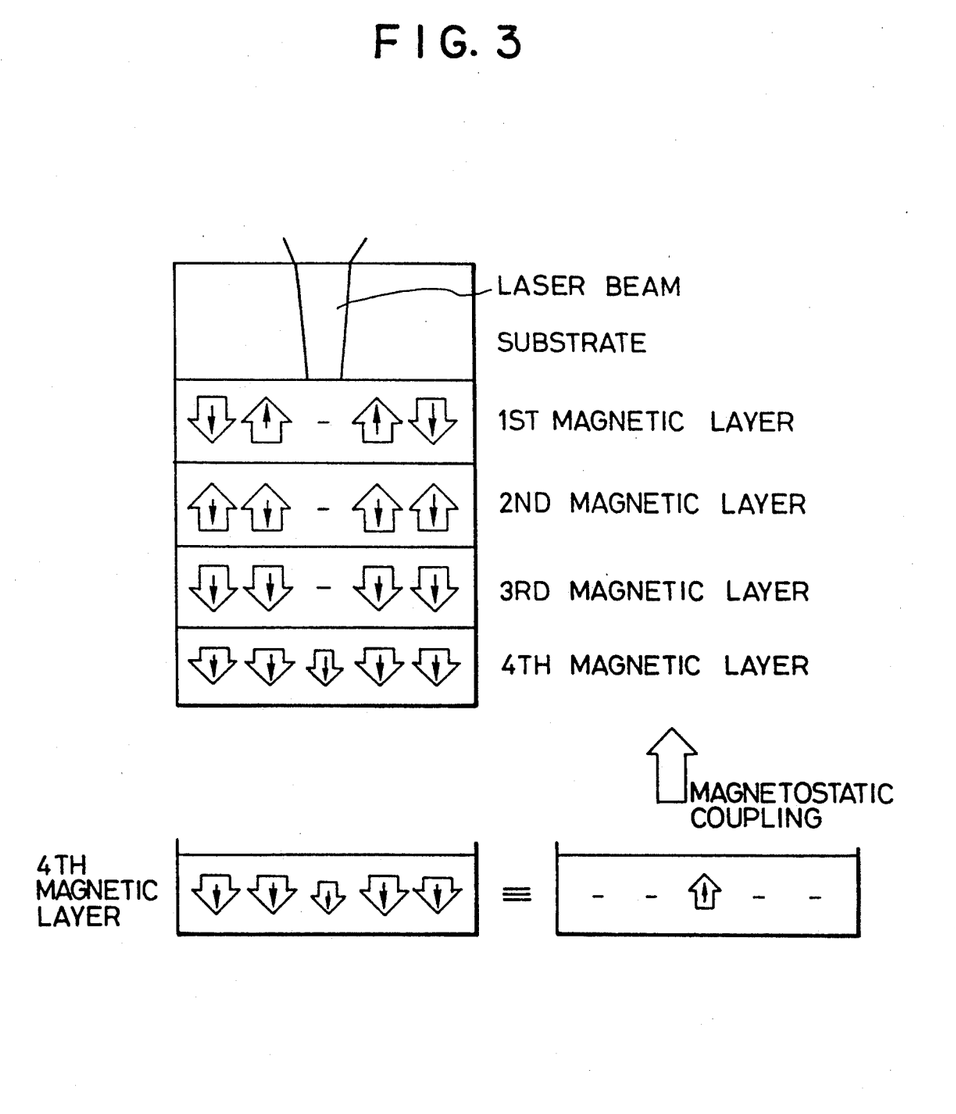
FIG. 3 is an explanatory drawing illustrating the magnetization distribution of the fourth magnetic layer.

A feature of this invention is that it makes use of magnetostatic coupling with the fourth magnetic layer. In a magneto-optical recording medium that is locally heated in high-temperature operation, the magnetization distribution of the fourth magnetic layer is as in FIG. 3, creating in effect an upwardly oriented magnetic field.

In this way, optically modulated direct overwriting is possible by modulating only the laser light intensity. In magneto-optical recording media having the above-mentioned dielectric layer, magnetic layers, and protective layer on a substrate with grooves spaced at 1.6 μm intervals, a CN ratio of 45 dB, with no remanent unerased signal, was obtained by writing a signal with 0.76 μm bit length on a signal with 2 μm bit length at a linear speed of 11 m/sec with a peak laser power of 13 mW and bottom power of 5 mW.

Embodiments 2 to 6

Tables 1 and 2 show embodiments 2 to 6. Using four-element RF magnetron sputtering apparatus, one places an Fe target having Tb and Co chips, an Fe target having Gd and Co chips, an Fe target having Tb chips, and a Co target having Tb chips, and sets in the chamber of the apparatus a glass substrate 1.2 mm thick and 86 mm in diameter, that is pregrooved at a 1.6 μm pitch.

After evacuation of the chamber of the apparatus to a vacuum of $8 \times 10^{-7}$ Torr or less, Ar gas is introduced at 3 mTorr, and sputtering is performed at a deposition rate of substantially 100 angstroms per minute. This creates a first magnetic layer of TbFeCo 800 angstroms thick on the substrate. Next a second magnetic layer of GdDyFeCo 1500 angstroms thick, a third magnetic layer of TbFe 100 angstroms thick, and a fourth magnetic layer of TbCo 400 angstroms thick are created in similar fashion, the vacuum condition being maintained all the while. Each of the magnetic layers is a perpendicularly magnetized layer, and adjacent layers are coupled by an exchange force. The lower table indicates the recording and reproduction characteristics of a 0.76 μm bit-length signal on a 2 μm bit-length signal under linear velocity conditions of 11 m/sec for various numbers of chips on the targets and for various sputtering times. Direct overwriting was confirmed in this case with no observed remanent unerased signal.

TABLE 1

| No. | 1ST MAG. LAYER | 2ND MAG. LAYER | 3RD MAG. LAYER | 4TH MAG. LAYER |
|---|---|---|---|---|
| 2 | $Tb_{23}Fe_{72}Co_5$ 800 angstroms | $Gd_5Dy_{22}Fe_{65}Co_8$ 2000 angstroms | $Tb_{20}Fe_{80}$ 800 angstroms | $Tb_{18}Co_{82}$ 2000 angstroms |
| 3 | $Tb_{23}Fe_{72}Co_5$ | $Gd_5Dy_{22}Fe_{65}Co_8$ | $Tb_{20}Fe_{80}$ | $Tb_{18}Co_{82}$ |

TABLE 1-continued

| No. | 1ST MAG. LAYER | 2ND MAG. LAYER | 3RD MAG. LAYER | 4TH MAG. LAYER |
| --- | --- | --- | --- | --- |
| 4 | 800 angstroms $Tb_{23}Fe_{72}Co_5$ | 1500 angstroms $Gd_5Dy_{22}Fe_{65}Co_8$ | 100 angstroms $Tb_{20}Fe_{80}$ | 1000 angstroms $Tb_{18}Co_{82}$ |
| 5 | 800 angstroms $Tb_{23}Fe_{72}Co_5$ | 1200 angstroms $Gd_5Dy_{22}Fe_{65}Co_8$ | 100 angstroms $Tb_{20}Fe_{80}$ | 800 angstroms $Tb_{18}Co_{82}$ |
| 6 | 800 angstroms $Tb_{23}Fe_{77}$ 1000 angstroms | 1200 angstroms $Gd_5Dy_{22}Fe_{65}Co_8$ 1200 angstroms | 100 angstroms $Tb_{15}Dy_5Fe_{80}$ 100 angstroms | 800 angstroms $Tb_{18}Co_{82}$ 800 angstroms |

TABLE 2

| No. | Peak Power (mW) | Bottom Power (mW) | Signal-to-Noise Ratio (dB) |
| --- | --- | --- | --- |
| 2 | 16.5 | 7.0 | 40.9 |
| 3 | 14.0 | 6.5 | 42.0 |
| 4 | 13.0 | 4.5 | 43.1 |
| 5 | 11.5 | 4.5 | 45.4 |
| 6 | 10.0 | 4.0 | 41.1 |

Each of the magnetic layers here may itself comprise multiple sublayers: for example, before the first magnetic layer is formed, an exchange-coupled magnetic layer with a large magneto-optic effect may be provided. An improvement in CNR by 1 dB was observed when the following were formed on a glass substrate by a method such as sputtering:

| | | |
| --- | --- | --- |
| Dielectric layer: | $SiN_x$ | 650 angstroms |
| Reproduction layer: | $Tb_{15}Fe_{70}Co_{15}$ | 100 angstroms |
| First magnetic layer: | $Tb_{22}Fe_{69}Co_9$ | 800 angstroms |
| Second magnetic layer: | $Gd_8Dy_{17}Fe_{60}Co_{15}$ | 1500 angstroms |
| Third magnetic layer: | $Tb_{16}Fe_{84}$ | 200 angstroms |
| Fourth magnetic layer: | $Tb_{20}Co_{80}$ | 400 angstroms |
| Protective layer: | $SiN_x$ | 700 angstroms |

Magnetic layers, dielectric layers, oxide layers, and the like can also be created between the magnetic layers to control the exchange forces. The magnetic layers may also comprise ferrimagnetic materials such as GdFe, GdTbFeCo, TbDyFeCo, NdDyFeCo, DyCo, TbHoFeCo, and DyHoCo.

Embodiment 7

Two single-sided media were adhesively joined by a two-part epoxy-based resin. When magneto-optical recording media of the first embodiment were joined together, for example, in a magneto-optical recording medium with a protective layer, a CN ratio of 45 dB, with no remanent unerased signal, was obtained by optical modulation of a 0.76 μm bit-length signal on a 2 μm bit-length signal at a linear velocity of 11 m/sec with a peak laser power of 14 mW and bottom laser power of 5 mW. Adhesion may also be accomplished with a thermoplastic resin, thermosetting resin, or the like, and what is joined may be a read-only optical disk, a write-once optical disk, or the like. The media may also have shapes other than disk shapes: for example, they may have a card shape or the like.

Embodiment 8

Figure 4A:
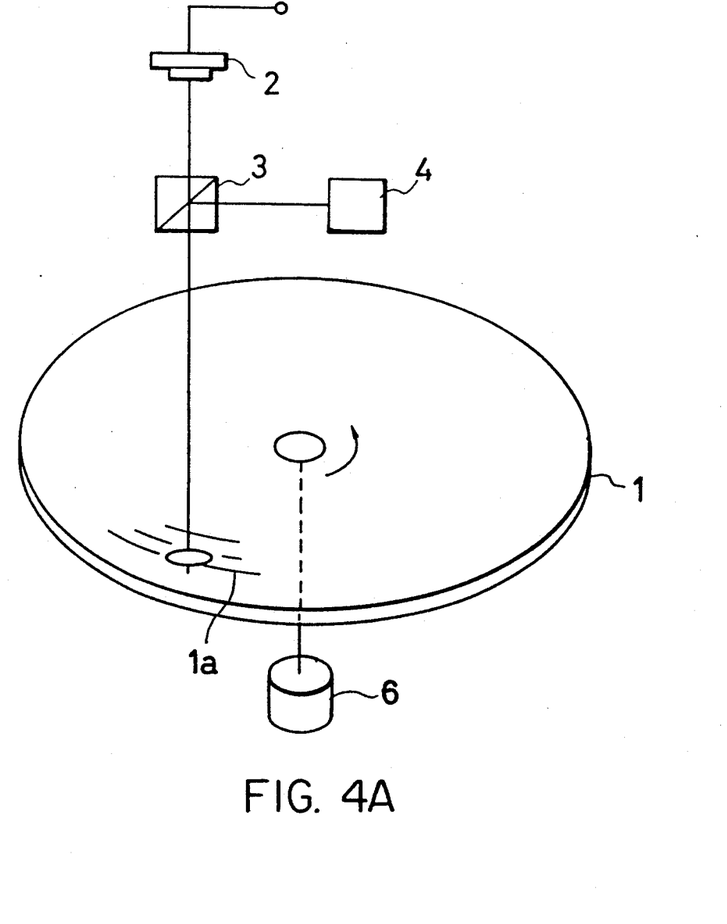
FIGS. 4 to 10 are structural drawings of magneto-optical recording apparatus according to embodiments of the invention.
Figure 4B:
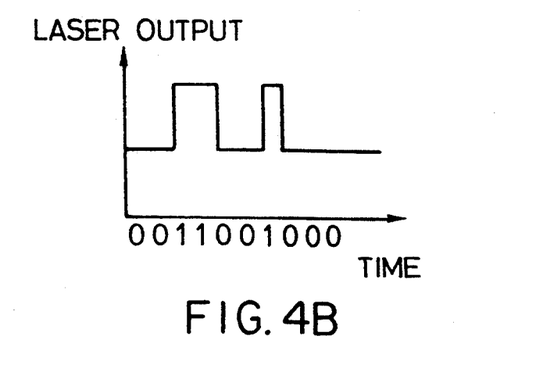

FIG. 4 shows a structural drawing of a magneto-optical recording apparatus. In the drawing, 1 is a magneto-optical recording medium, 2 is a semiconductor laser, 3 is a polarizing beam splitter, and 4 is a reproducing apparatus. The semiconductor laser is adapted for binary modulation of the beam intensity of the recording laser beam according to the information to be recorded, with output exceeding the laser beam intensity during reproduction. The magneto-optical recording medium is in the form of a disk having recording tracks 1a in spiral or circular form, and is rotated about is axis, by a motor 6, so that the disk is moved relative to the laser beam. Using the magneto-optical recording medium of the first embodiment, a CN ratio of 45 dB, with no remanent unerased signal, was obtained by optical modulation of a 0.76 μm bit-length signal on a 2 μm bit-length signal at a linear velocity of 11 m/sec with a peak laser power of 13 mW and bottom laser power of 5 mW.

Embodiment 9

Figure 5A:
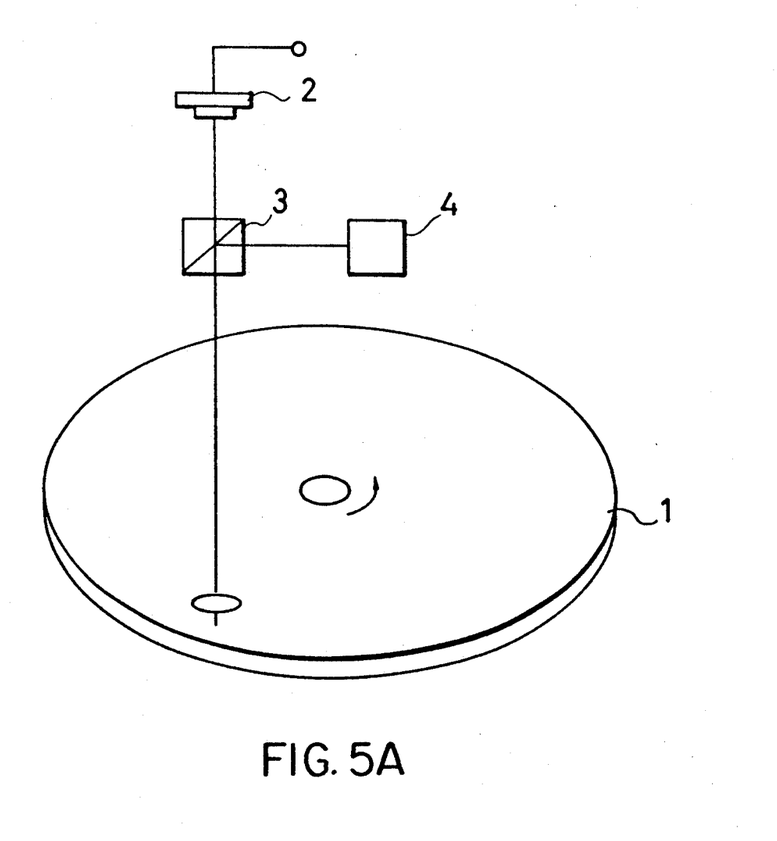
Figure 5B:
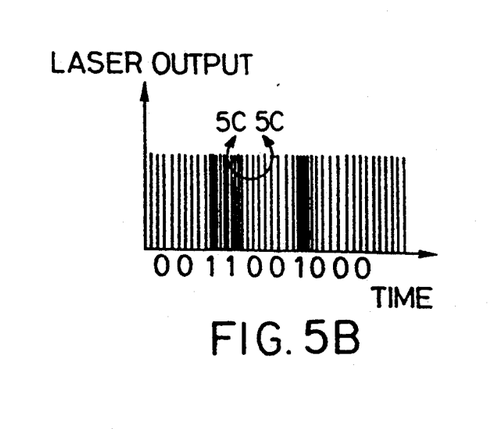
Figure 5C:
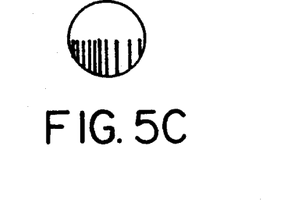

FIG. 5 shows a structural drawing of a magneto-optic recording apparatus. In the drawing, 1 is a magneto-optical recording medium, 2 is a semiconductor laser, 3 is a beam splitter, and 4 is a reproducing apparatus. The laser beam emitted by the semiconductor laser can be generated in a pulse pattern suitable for high-temperature operation, comprising a pulse train of twenty times the maximum frequency of the recorded information, and a pulse pattern suitable for low-temperature operation, comprising a pulse train of ten times the maximum frequency of the recorded information. Identical values were employed for respective constituent pulses at this time. Using the magneto-optical recording medium of the first embodiment, overwriting with no remanent unerased signal was possible by optical modulation of a 0.76 μm bit-length signal on a 2 μm bit-length signal at a linear velocity of 11 m/sec with a peak laser power of 15 mW.

Embodiment 10

Figure 6A:
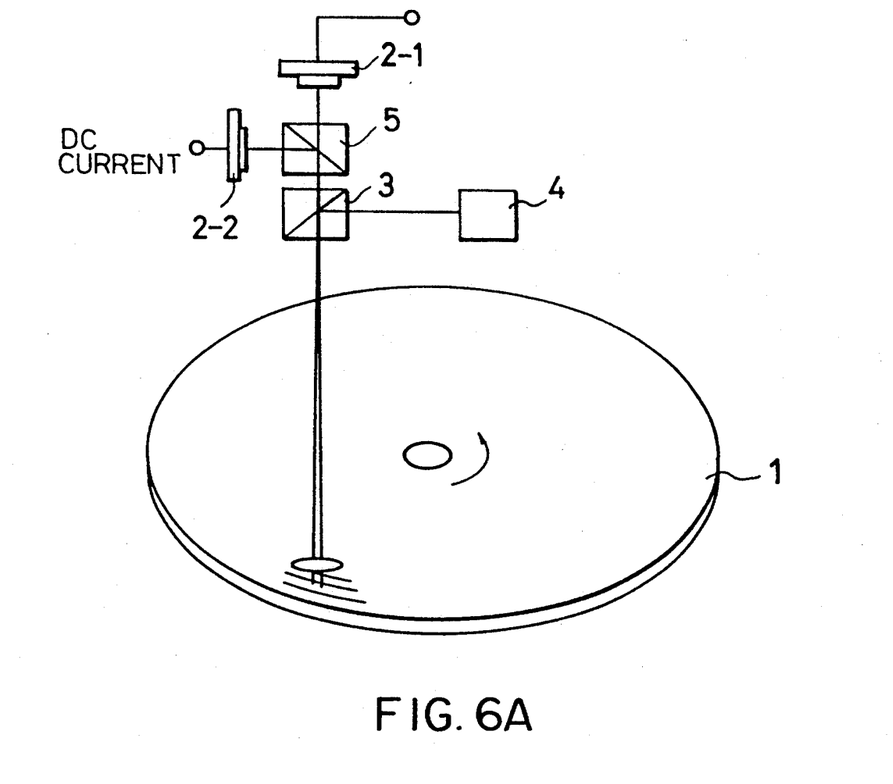
Figure 6B:
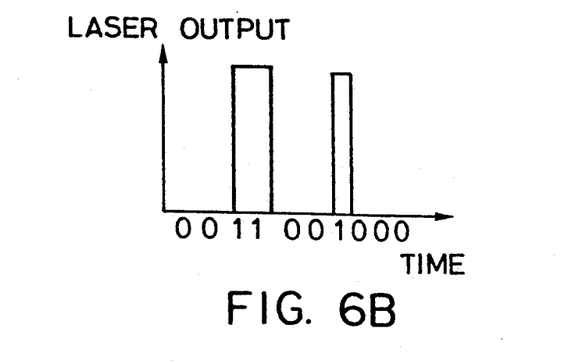

FIG. 6 shows a structural drawing of a magneto-optical recording apparatus. In the drawing, 1 is a magneto-optical recording medium, 2-1 and 2-2 are semiconductor lasers, 3 is a polarizing beam splitter, 4 is a reproducing apparatus, and 5 is a beam splitter. The semiconductor lasers 2-1 and 2-2 have a wavelength of 830 nm and maximum continuous emitted output of 16 mW, and are focused onto adjacent positions on the magneto-optical recording medium. One of the lasers generates constant laser output suitable for low-temperature operation, while the other laser generates laser output that attains the temperature necessary for high-temperature operation only for the information "1." In this case direct overwriting was possible using the magneto-optical recording medium of embodiment 1 with the maximum laser output on the surface of the recording medium reduced by 3 mW, to 10 mW.

Embodiment 11

Figure 7A:
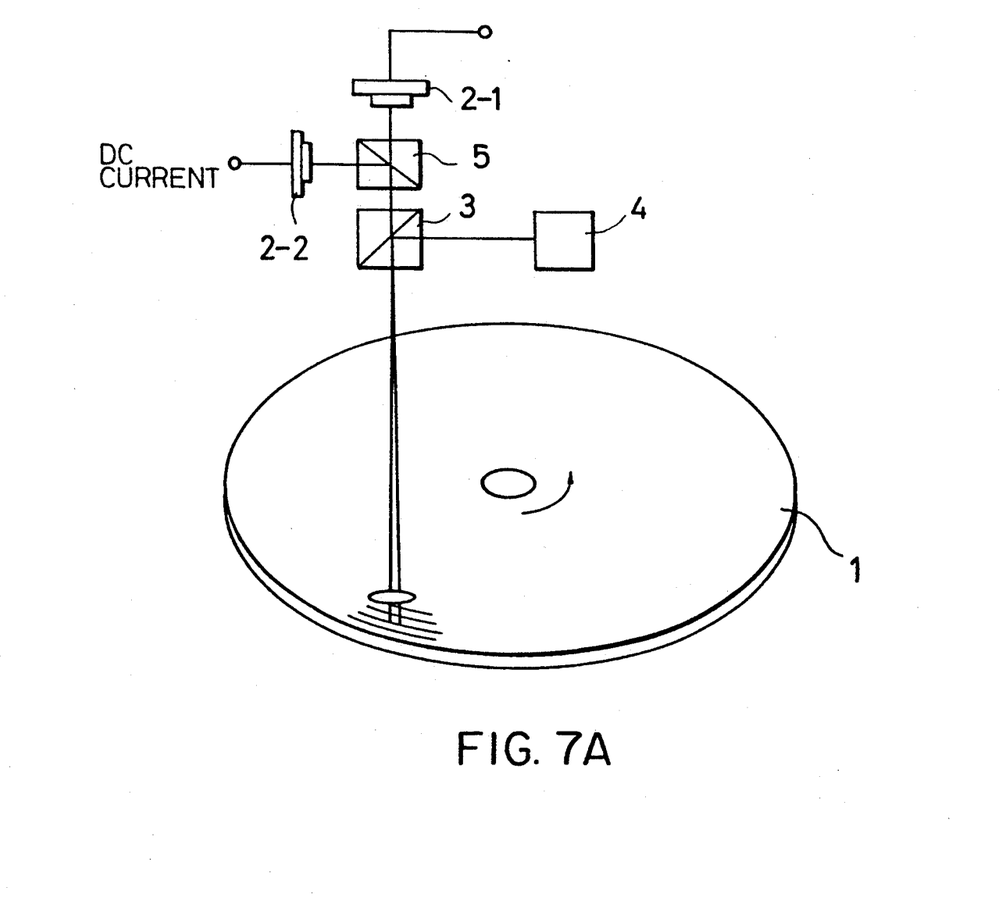
Figure 7B:
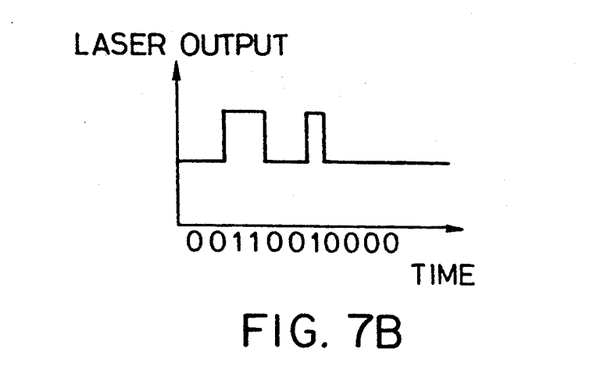

FIG. 7 shows a structural drawing of a magneto-optical recording apparatus. In the drawing, 1 is a magneto-optical recording medium, 2-1 and 2-2 are semiconductor lasers, 3 is a polarizing beam splitter, 4 is a reproducing apparatus, and 5 is a beam splitter. The semiconductor laser 2-1 is for recording, having a wavelength of 830 nm and maximum continuous emitted output of 20 mW, while 2-2 is for reproducing, having a wavelength of 780 nm and maximum continuous emitted output of 4 mW, adapted for tracking the laser spot of 2-1, enabling verification to be performed simultaneously with overwriting. In this way data transfer rates during recording were made substantially equal to those during reproducing.

Embodiment 12

Figure 8A:
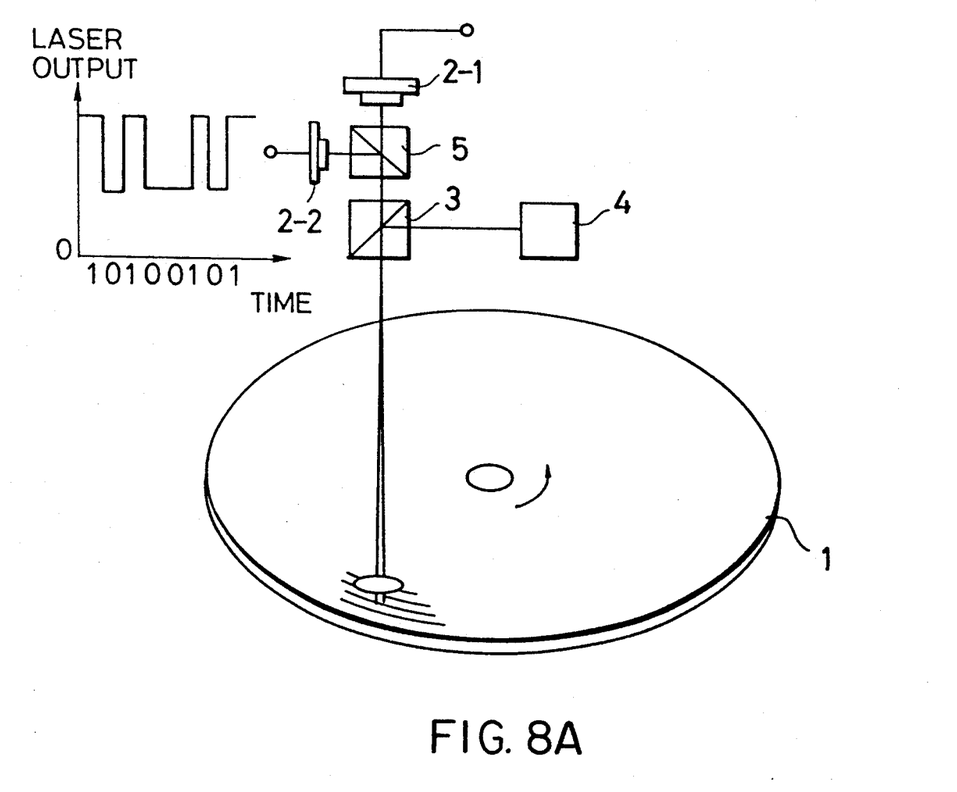
Figure 8B:
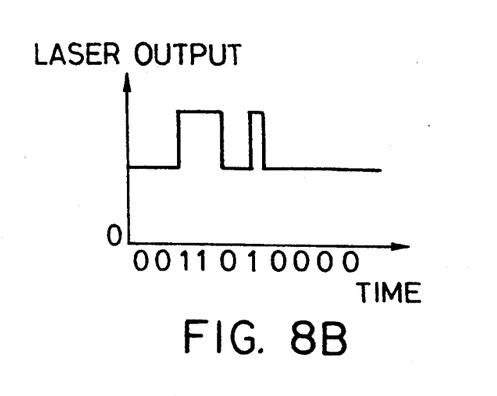

FIG. 8 shows a structural drawing of a magneto-optical recording apparatus. In the drawing, 1 is a magneto-optical recording medium, 2-1 and 2-2 are identical semiconductor lasers with a wavelength of 830 nm and maximum continuous emitted output of 20 mW, 3 is a polarizing beam splitter, 4 is a reproducing apparatus, and 5 is a beam splitter. The laser beams are focused onto adjacent tracks on the magneto-optical recording medium and are adapted for simultaneous recording.

Here the magneto-optical recording medium is moved, but lasers can also be arranged in an array or matrix for recording and reproduction without moving the magneto-optical recording medium.

It is also possible to place in the optical path an optical element, such as a liquid crystal, the transmittance of which can be spatially varied.

Embodiment 13

Figure 9A:
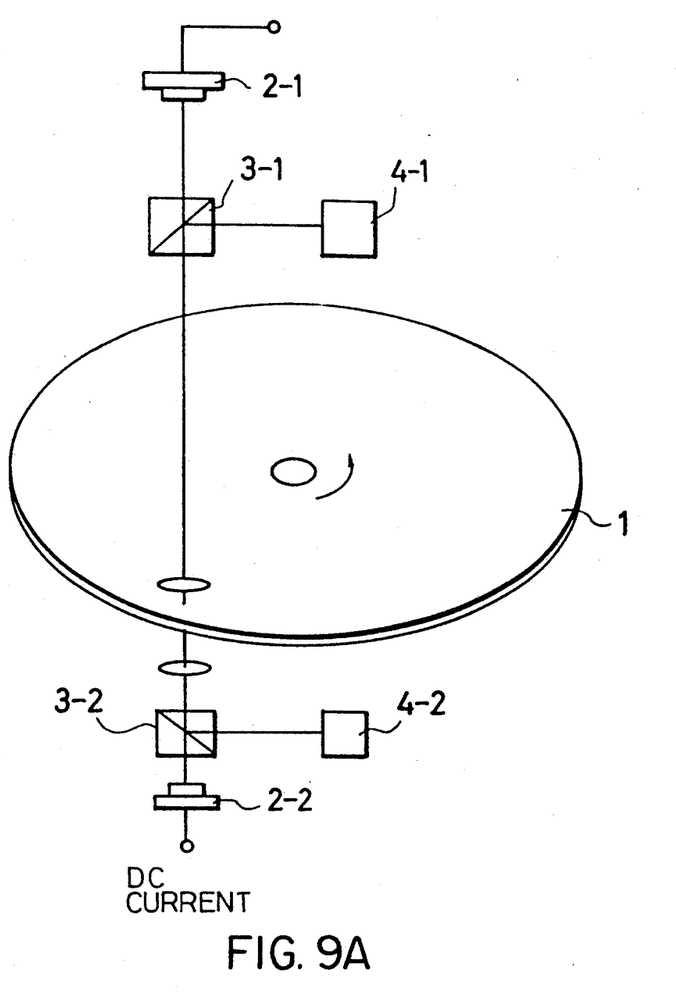
Figure 9B:
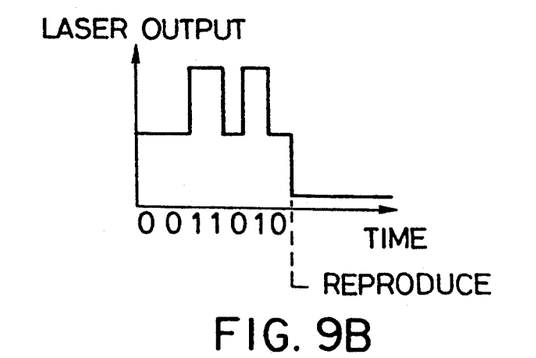

FIG. 9 shows a structural drawing of a magneto-optical recording apparatus. In the drawing, 1 is a magneto-optical medium, 2-1 and 2-2 are semiconductor lasers disposed on both sides of the optical recording medium, 3 is a polarizing beam splitter, and 4-1 and 4-2 are reproducing apparatuses. The optical recording medium of embodiment 7 is employed as an optical recording medium, and the semiconductor laser 2-2 and reproducing apparatus 4-2 can reproduce read-only optical disks.

As described above, in a recording medium with four exchange-coupled magnetic layers, this invention provides the orientation layer with two opposing functions, an exchange force and a magnetostatic coupling force, enabling direct overwriting without any device for generating an external magnetic field.

What is claimed is:

1. A magneto-optical recording medium for use in a system for recording information with bits having upward magnetization and having downward magnetization on a recording layer of the magneto-optical recording medium, comprising:

a first magnetic layer with perpendicular magnetic anisotropy, said first magnetic layer having a Curie temperature $Tc1$, a second magnetic layer disposed on this first magnetic layer and coupled to said first magnetic layer by an exchange force, said second magnetic layer having Curie temperature $Tc2$, a third magnetic layer disposed on this second magnetic layer and coupled to said second magnetic layer by an exchange force, said third magnetic layer having a Curie temperature $Tc3$, and a fourth magnetic layer disposed on this third magnetic layer and coupled to said third magnetic layer by an exchange force, said fouth magnetic layer having a Curie temperature $Tc4$;

said magneto-optical recording medium satisfying:
$Tc4 > Tc1$,
$Tc4 > Tc3$,
$Tc2 > Tc1$, and
$Tc2 > Tc3$, the magnetization of the first magnetic layer being not reversed by magnetic reversal of the second magnetic layer at room temperature, wherein a sublattice magnetization direction of each of the second magnetic layer, the third magnetic layer, and the fourth magnetic layer is initialized so as to be aligned in one of two opposite directions at room temperature after recording, and wherein the fourth magnetic layer has a magnetization value which is reduced in the vicinity of a first predetermined temperature greater than room temperature as compared to a magnetization value of the fourth magnetic layer in the vicinity of room temperature, whereby a stray magnetic field generated by said magneto-optical recording medium acts so that the sublattice magnetization direction of the second magnetic layer is recorded in the direction opposite to said initialization direction.

2. The medium of claim 1, wherein said second magnetic layer comprises a layer of magnetic material having a compensation temperature below its Curie temperature, and said fourth magnetic layer comprises a layer of a magnetic material including a transition metal sublattice having a magnetization said fourth magnetic layer having a magnetization existing in the direction, of the transition-metal sublattice magnetization is reduced as temperature rises.

3. The medium of claim 1, wherein said second magnetic layer comprises a layer of magnetic material including a rare-earth sublattice having a magnetization which is dominant at room temperature and which does not have a compensation temperature, and said fourth magnetic layer is formed of a magnetic material having a magnetization existing in the direction of the rare-earth sublattice magnetization which is reduced as temperature rises.

4. A recording medium comprising a magneto-optical recording medium as set forth in claim 1, and one of a read-only optical recording medium, or a write-once optical recording medium, which is adhesively joined to said magneto-optical recording medium.

5. A magneto-optical recording system for recording information with bits having upward magnetization and having downward magnetization on a recording layer of a magneto-optical recording medium, comprising:

a magneto-optical recording medium having a first magnetic layer with perpendicular magnetic anisotropy, said first magnetic layer having a Curie temperature $Tc1$, a second magnetic layer disposed on this first magnetic layer and coupled to said first magnetic layer by an exchange force, said second magnetic layer having a Curie temperature $Tc2$, a third magnetic layer disposed on this second magnetic layer and coupled to said second magnetic layer by an exchange force, said third magnetic layer having a Curie temperature $Tc3$, and a fourth magnetic layer disposed on this third magnetic layer and coupled to said third magnetic layer by an exchange force, said fourth magnetic layer having a Curie temperature $Tc4$;

a laser for emitting a laser beam;

a means for directing the laser beam onto the medium; and a means for modulating said beam to heat said magneto-optical recording medium to at least two values according to binary information to be recorded;

said magneto-optical recording medium satisfying:
$Tc4 > Tc1$,
$Tc4 > Tc3$, $Tc2 > Tc1$, and
$Tc2 > Tc3$,
a magnetization of the first magnetic layer being not reversed by magnetic reversal of the second magnetic layer at room temperature,
wherein
a sublattice magnetization direction of each of the second magnetic layer, the third magnetic layer, and the fourth magnetic layer is initialized so as to be aligned in one of two opposite directions at room temperature after recording, and
under illumination by the laser beam that heats said magneto-optical medium to the higher temperature of said two laser beam values, a magnetization value of the fourth magnetic layer is reduced as compared to a magnetization value of the fourth magnetic layer in the vicinity of room temperature, whereby a stray magnetic field generated by said magneto-optical recording medium acts so that the sublattice magnetization direction of the second magnetic layer is recorded in the direction opposite to said initialization direction.

6. The system of claim 5, employing a magneto-optical recording medium using for its second magnetic layer a layer of magnetic material having a compensation temperature below its Curie temperature, and using for its fourth magnetic layer a magnetic material including a transition-metal sublattice having a magnetization direction, said fourth magnetic layer have a magnetization existing in the direction of the transition-metal sublattice magnetization which is reduced as temperature rises.

7. The system of claim 5, employing a magnetic recording medium using for its second magnetic layer a layer of magnetic material a rare-earth sublattice magnetization of which is dominant at room temperature and which does not have a compensation temperature, and using for its fourth magnetic layer a magnetic material including a rare-earth sublattice having a magnetization, said fourth magnetic layer having a magnetization existing in the direction of the rare-earth sublattice magnetization which is reduced as temperature rises.

8. A system of claim 5, wherein said magneto-optical recording medium is adhesively joined to one of a read-only optical recording medium, or a write-once optical recording medium.

9. A magneto-optical recording medium for use in a system for recording information as regions having a first magnetization direction and other regions having a second magnetization direction, comprising:
a first magnetic layer having vertical magnetic anisotropy, having a magnetization and having a Curie temperature $Tc1$;
a second magnetic layer disposed on the first magnetic layer and coupled thereto by an exchange force, having vertical magnetic anisotropy, having a Curie temperature $Tc2$, and having a magnetization with a direction which is more easily reversed than the magnetization of the first magnetic layer;
a third magnetic layer disposed on the second magnetic layer and coupled thereto by an exchange force, having vertical magnetic anisotropy, having a Curie temperature $Tc3$; and
a fourth magnetic layer disposed on the third magnetic layer and coupled thereto by an exchange force, having vertical magnetic anisotropy, having a Curie temperature $Tc4$, and having a magnetization with a direction that does not change while recording information and which has a first value at room temperature and which has a second value less than the first value at a predetermined temperature elevated above room temperature, whereby a magnetic field near a region of the fourth magnetic layer heated to the predetermined, temperature acts to magnetize the second magnetic layer in a direction opposite the constant direction;
said Curie temperatures satisfying:
$Tc4 > Tc1$,
$Tc4 > Tc3$,
$Tc2 > Tc1$, and
$Tc2 > Tc3$.

10. The medium of claim 9, wherein the second magnetic layer comprises a layer of magnetic material having a compensation temperature below its Curie temperature.

11. The medium of claim 10, wherein the fourth magnetic layer comprises a layer of magnetic material having a transition-metal sublattice with a magnetization in a predetermined direction,
the fourth magnetic layer further having a magnetization at room temperature in a direction parallel with the predetermined direction said magnetization being reduced at a temperature above room temperature.

12. The medium of claim 9, wherein the second magnetic layer comprises a layer of magnetic material without a compensation temperature.

13. The medium of claim 12, wherein the fourth magnetic layer comprises a layer of a material having a dominant rare-earth sublattice with a sublattice magnetization in a predetermined direction at room temperature,
the sublattice magnetization being reduced at a temperature above room temperature.

14. The medium of claim 9 for use in a system having access to a second side of the medium, further comprising:
one of a read-only optical recording medium or a write-once optical recording medium, adhesively bound thereto.

15. A magneto-optical recording medium for use in a system for recording information as regions having a first magnetization direction and other regions having a second magnetization direction, comprising:
a first magnetic layer having vertical magnetic anisotropy, having a magnetization and having a Curie temperature $Tc1$;
a second magnetic layer disposed on the first magnetic layer and coupled thereto by an exchange force, having vertical magnetic anisotropy, having a Curie temperature $Tc2$, and having a magnetization with a direction which is more easily reversed than the magnetization of the first magnetic layer;
a third magnetic layer disposed on the second magnetic layer and coupled thereto by an exchange force, having vertical magnetic anisotropy, having a Curie temperature $Tc3$; and
a fourth magnetic layer disposed on the third magnetic layer and coupled thereto by an exchange force, having vertical magnetic anisotropy, having a Curie temperature $Tc4$;
said Curie temperatures satisfying:
$Tc4 > Tc1$,
$Tc4 > Tc3$,
$Tc2 > Tc1$, and
$Tc2 > Tc3$; and wherein the fourth magnetic layer has a magnetization at a predetermined temperature greater than room temperature that is less than the magnetization at room temperature, and the magnetization has a direction at the predetermined temperature which is the same as the direction at room temperature.

16. The medium of claim 15, wherein the second magnetic layer comprises a layer of magnetic material having a compensation temperature below its Curie temperature.

17. The medium of claim 16, wherein the fourth magnetic layer comprises a layer of magnetic material having a transition-metal sublattice with a magnetization in a predetermined direction, the fourth magnetic layer further having a magnetization at room temperature in a direction parallel with the predetermined direction said magnetization being reduced at a temperature above room temperature.

18. The medium of claim 15, wherein the second magnetic layer comprises a layer of magnetic material without a compensation temperature.

19. The medium of claim 18, wherein the fourth magnetic layer comprises a layer of a material having a dominant rare-earth sublattice with a sublattice magnetization in a predetermined direction at room temperature, the sublattice magnetization being reduced at a temperature above room temperature.

20. The medium of claim 15 for use in a system having access to a second side of the medium, further comprising:

one of a read-only optical recording medium or a write-once optical recording medium, adhesively bound thereto.

21. A magneto-optical recording medium for use in a system for recording information as region have a first magnetization direction and other regions having a second magnetization direction, comprising:

a first magnetic layer have a Curie temperature $Tc1$; a second magnetic layer disposed on the first magnetic layer having a Curie temperature $Tc2$; a third magnetic layer disposed on the second magnetic layer having a Curie temperature $Tc3$; and a fourth magnetic layer disposed on the third magnetic layer having a Curie temperature $Tc4$;

said magnetic layers having vertical magnetic anisotropy, and adjacent magnetic layers coupled each to the other by an exchange force;

said Curie temperatures satisfying:

$Tc4 > Tc1$,
$Tc4 > Tc3$,
$Tc2 > Tc1$, and
$Tc2 > Tc3$;

wherein the fourth magnetic layer has a magnetization at predetermined temperature greater than room temperature that is less than the magnetization at room temperature, and the magnetization has a direction at the predetermining temperature which is the same as the direction at room temperature, whereby a field magnetostatically coupled from the fourth layer to the second layer at the predetermined temperature has a field direction that is opposite to the field direction at room temperature; and wherein the magnetization of the second magnetic layer has a direction which is more easily reversed than the magnetization of the first magnetic layer, and further wherein the magnetization direction of the second magnetic layer is easily oriented by the field magnetostatically coupled from the fourth magnetic layer.

22. The medium of claim 21, wherein the second magnetic layer comprises a layer of magnetic material having a compensation temperature below its Curie temperature.

23. The medium of claim 22, wherein the fourth magnetic layer comprises a layer of magnetic material having a transition-metal sublattice with a magnetization in a predetermined direction, the fourth magnetic layer further having a magnetization at room temperature in a direction parallel with the predetermined direction said magnetization being reduced at a temperature above room temperature.

24. The medium of claim 21, wherein the second magnetic layer comprises a layer of magnetic material without a compensation temperature.

25. The medium of claim 24, wherein the fourth magnetic layer comprises a layer of a material having a dominant rare-earth sublattice with a sublattice magnetization in a predetermined direction at room temperature, the sublattice magnetization being reduced at a temperature above room temperature.

26. The medium of claim 21 for use in a system having access to a second side of the medium, further comprising:

one of a read-only optical recording medium or a write-once optical recording medium, adhesively bound thereto.

* * * * *